US 12,061,596 B1

United States Patent
Starratt et al.

(10) Patent No.: US 12,061,596 B1
(45) Date of Patent: Aug. 13, 2024

(54) METHODS AND SYSTEMS FOR GENERATING DYNAMIC CONTEXT DATA ASSOCIATED WITH A DIGITAL REQUEST DATA OBJECT IN A MULTI-APPLICATION NETWORK

(71) Applicant: Black Knight IP Holding Company, LLC, Jacksonville, FL (US)

(72) Inventors: Kara S. Starratt, Jacksonville, FL (US); David W. Denson, Jacksonville, FL (US); James A. Iredale, Ponte Vedra Beach, FL (US); Sandra T. Madigan, Jacksonville, FL (US); Erik J. Skinner, Sturgeon Bay, WI (US); Lesley Grimes, Jacksonville, FL (US)

(73) Assignee: BLACK KNIGHT IP HOLDING COMPANY, LLC, Jacksonville, FL (US)

( * ) Notice: Subject to any disclaimer, the term of this patent is extended or adjusted under 35 U.S.C. 154(b) by 0 days.

(21) Appl. No.: 18/373,813

(22) Filed: Sep. 27, 2023

(51) Int. Cl.
  *G06F 16/23* (2019.01)
  *H04L 41/22* (2022.01)
(52) U.S. Cl.
  CPC .......... *G06F 16/2365* (2019.01); *H04L 41/22* (2013.01)
(58) Field of Classification Search
  None
  See application file for complete search history.

(56) References Cited

U.S. PATENT DOCUMENTS

| | | |
|---|---|---|
| 6,434,628 B1 * | 8/2002 | Bowman-Amuah ........................ H04L 67/568 714/48 |
| 9,130,900 B2 | 9/2015 | Tran |
| 9,830,187 B1 | 11/2017 | Blaine et al. |
| 10,068,301 B2 | 9/2018 | Kogut-O'Connell et al. |
| 10,810,361 B1 | 10/2020 | Venkatraman et al. |
| 10,963,316 B2 | 3/2021 | Gopalan et al. |

(Continued)

OTHER PUBLICATIONS

Workgrid. "What is a Digital Assistant?" Jun. 1, 2023 snapshot via Archive.org. URL Link: <https://workgrid.com/article/what-is-a-digital-assistant>. Accessed Nov. 2023. (Year: 2023).*

(Continued)

*Primary Examiner* — Irene Baker
(74) *Attorney, Agent, or Firm* — Baker McKenzie LLP

(57) ABSTRACT

Disclosed are methods and apparatuses for generating or updating dynamic context data associated with a digital request data object in a multi-application network. receiving, a first input associated with the digital request data object; determining based on the first input, the digital request data object from the one or more databases associated with the multi-application network; determining profile data indicating one or more of: user data associated with first input, and trajectory data associated with one or more computing operations executed on the digital request data object; extracting metadata associated with the digital request data object; receiving a second input associated with the digital request data object; generating, based on the metadata, the profile data, and the second input, dynamic context data for (Continued)

the digital request data object; and storing the dynamic context data in the one or more databases associated with the multi-application network.

23 Claims, 6 Drawing Sheets

(56) References Cited

U.S. PATENT DOCUMENTS

| | | | |
|---|---|---|---|
| 11,379,268 | B1 | 7/2022 | Gupta |
| 11,379,897 | B1 | 7/2022 | Thomas |
| 2002/0002453 | A1 | 1/2002 | Lazaridis et al. |
| 2002/0078432 | A1 | 6/2002 | Charisius et al. |
| 2002/0138449 | A1 | 9/2002 | Kendall et al. |
| 2003/0233374 | A1 | 12/2003 | Spinola et al. |
| 2004/0215552 | A1 | 10/2004 | Horn et al. |
| 2005/0028073 | A1 | 2/2005 | Henry et al. |
| 2005/0165734 | A1 | 7/2005 | Vicars et al. |
| 2006/0069596 | A1 | 3/2006 | Hatoun et al. |
| 2006/0069605 | A1 | 3/2006 | Hatoun et al. |
| 2006/0074714 | A1 | 4/2006 | Aziz et al. |
| 2008/0114791 | A1 | 5/2008 | Takatsu et al. |
| 2009/0089869 | A1* | 4/2009 | Varghese ............... G07F 7/1008 726/7 |
| 2009/0276340 | A1 | 11/2009 | Knapp |
| 2010/0050153 | A1 | 2/2010 | Louie et al. |
| 2010/0070464 | A1 | 3/2010 | Aymeloglu et al. |
| 2011/0055180 | A1 | 3/2011 | Lumley et al. |
| 2011/0282707 | A1 | 11/2011 | Rangaswamy et al. |
| 2013/0152021 | A1 | 6/2013 | Hatfield et al. |
| 2013/0212151 | A1 | 8/2013 | Herbach et al. |
| 2014/0047028 | A1 | 2/2014 | Buth |
| 2014/0351115 | A1 | 11/2014 | Dahiwadkar |
| 2015/0134600 | A1 | 5/2015 | Eisner et al. |
| 2016/0104067 | A1 | 4/2016 | Xu et al. |
| 2019/0268462 | A1 | 8/2019 | Yim et al. |
| 2020/0151630 | A1 | 5/2020 | Shakhnovich |
| 2020/0320407 | A1 | 10/2020 | Xiao et al. |
| 2020/0341834 | A1* | 10/2020 | Safary ................. G06F 11/2257 |
| 2020/0372088 | A1 | 11/2020 | Liu et al. |
| 2020/0394612 | A1 | 12/2020 | Khokhar et al. |
| 2020/0410395 | A1 | 12/2020 | Ray |
| 2021/0089375 | A1 | 3/2021 | Ghafourifar et al. |
| 2021/0192134 | A1 | 6/2021 | Yue et al. |
| 2022/0358286 | A1 | 11/2022 | Wilson-Thomas et al. |
| 2023/0004460 | A1* | 1/2023 | Nagar ..................... G06N 20/20 |
| 2023/0119035 | A1* | 4/2023 | Mee ......................... H04L 9/50 705/75 |
| 2023/0125194 | A1 | 4/2023 | Mertens |
| 2023/0134235 | A1 | 5/2023 | Setlur et al. |

OTHER PUBLICATIONS

Oracle. "What is a Digital Assistant?" Feb. 8, 2023 snapshot via Archive.org. URL Link: <https://www.oracle.com/chatbots/what-is-a-digital-assistant/>. Accessed Nov. 2023. (Year: 2023).*

Non-Final Office Action dated Nov. 22, 2023 in connection with U.S. Appl. No. 18/373,771, 14 pages.

Non-Final Office Action dated Dec. 20, 2023 in connection with U.S. Appl. No. 18/373,797, 22 pages.

Non-Final Office Action dated Jan. 31, 2024 in connection with U.S. Appl. No. 18/373,822, 23 pages.

Non-Final Office Action dated Nov. 22, 2023 in connection with U.S. Appl. No. 18/373,830, 30 pages.

Huang, Qiao, API Method Recommendation without Worrying about the Task-API Knowledge Gap. (Year: 2018).

* cited by examiner

INITIATING PRESENTATION OF THE DYNAMIC CONTEXT DATA FOR THE DIGITAL REQUEST DATA OBJECT SIMULTANEOUSLY WITH INITIATING PRESENTATION OF AN INPUT AREA FOR RECEIVING A THIRD INPUT ASSOCIATED WITH THE DIGITAL REQUEST DATA OBJECT, THE THIRD INPUT COMPRISING ONE OR MORE OF:
A SELECTION OF AT LEAST ONE SECOND COMPUTING OPERATION RECOMMENDATION GENERATED BASED ON THE SECOND INPUT; AND
A SECOND COMPUTING OPERATION ASSOCIATED WITH THE DIGITAL REQUEST DATA OBJECT
416

FIG. 4B

Welcome

Work Item: #1435D38D - REVIEW ACCOUNT
● In progress
Due Date: 06/23/2023
Description: REVIEW THE SHORTAGE

12:15 PM

Work Item: #1435D38D - REVIEW ACCOUNT
● In progress
Due Date: 06/23/2023
Description: REVIEW THE SHORTAGE

12:15 PM

Work Item: #1435D38D - REVIEW ACCOUNT
● In progress
Due Date: 06/23/2023
Description: REVIEW THE SHORTAGE

12:15 PM

_504_

_502_

Overview | Work Item | Notes

Work Item: #1435D38D - REVIEW ACCOUNT
● In progress

Originating System ID: ESCACT
Number: 0000173744
Area: ESC
Due Date: 06/23/2023
Date Created: 05/11/2023
Assigned To: 00o3ogwuhotsxmsW64h7
Created By: admin
Description: REVIEW THE SHORTAGE

Work Item History

Activated by 00o3ogwuhotsxmsW64h7
Comment
39 minutes ago

Claimed by 00o3ogwuhotsxmsW64h7
Comment
39 minutes ago

METHODS AND SYSTEMS FOR GENERATING DYNAMIC CONTEXT DATA ASSOCIATED WITH A DIGITAL REQUEST DATA OBJECT IN A MULTI-APPLICATION NETWORK

TECHNICAL FIELD

The present disclosure relates to methods, systems, and computer program products that facilitate the implementation and usage of dynamic context data in a multi-application network.

BACKGROUND

It is increasingly becoming needful to develop and use computational tools that efficiently detect, create, and/or update context data within a multi-application network to facilitate process optimizations including recommending one or more computing operations to a user, based on context data, so that a user may not need to dig through multiple applications to determine the appropriate application and/or computational tool to use for a computing operation. In addition, such strategies are needed to facilitate the development of trajectory models for application workflows within a multi-application network.

SUMMARY

The present disclosure is directed to methods, systems/apparatuses, and computer program products for generating and/or updating dynamic context data associated with a digital request data object in a multi-application network. The methods, for example, may include using a data engine to receive a first input associated with the digital request data object. The digital request data object can comprise a file, or a document, or a record, or profile data associated with a user request or profile data associated with a digital service comprised in or associated with the multi-application network. The file, document, record, or profile data associated with the digital request data object, or profile data associated with a service comprised in, or associated with the multi-application network can outline or be associated with one or more of account data associated with the digital request data object; or data indicating a stage-wise progression of analysis operations required to resolve an exception event associated with the digital request data object. In one embodiment, the first input received by the data engine may include a natural language input. For example, the natural language input may include one or more text or character strings associated with spoken and/or written language (e.g., English language, French language, Portuguese language, Chinese language, Japanese language, Korean language, Dutch language, etc.).

The methods may also include using the data engine to determine, based on the first input, the digital request data object from one or more databases associated with the multi-application network. The data engine may be further used to determine profile data indicating one or more of user data associated with the first input, and trajectory data associated with one or more computing operations executed (e.g., previously executed) on the digital request data object. The methods may also include using the data engine to extract, metadata associated with the digital request data object. The metadata may indicate one or more of: historical context data associated with the digital request data object; a processing stage associated with the digital request data object; and one or more exception events associated with the digital request data object.

The methods may further include using the data engine to receive a second input associated with the digital request data object. The second input may comprise one of: a selection of at least one computing operation recommendation generated based on the first input; or a computing operation associated with the digital request data object. Furthermore, the methods include using the data engine to generate or update, based on the metadata, the profile data, and the second input, dynamic context data for the digital request data object. The data engine may be used to store, the dynamic context data in the one or more databases associated with the multi-application network. The methods may also include initiating, using the one or more computing device processors, presentation of the dynamic context data for the digital request data simultaneously with initiating presentation of an input area for receiving a third input associated with the digital request data object. The third input may comprise one or more of: a selection of at least one second computing operation recommendation generated based on the second input, and/or a second computing operation associated with the digital request data object.

These and other implementations may each optionally include one or more of the following features. In some embodiments, the profile data comprises device data associated with a computing device from which the first input was received. Furthermore, the computing operation associated with digital request data object may comprise a computing command that resolves a first exception event comprised in the one or more exception events associated with the digital request data object.

In some embodiments, generating the dynamic context data based on the metadata, the profile data, and the second input comprises: scanning the metadata and the profile data to generate static context data; and linking the static context data to at least one computing operation executed on the digital request object based on the second input to generate the dynamic context data. According to some embodiments, the second input is associated with a computing operation for analyzing, solving, addressing, or managing a detected exception event associated with the digital request data object.

Furthermore, analyzing the first input comprises: resolving the natural language input into one or more data strings; and applying semantic or syntactic data to the one or more data strings to generate a plurality of computing operation recommendations including the at least one computing operation recommendation. The one or more data strings may comprise a sequence of characters including letters, numbers, symbols and blank spaces associated with a natural language.

According to one embodiment, a first computing operation result associated with the selection of the at least one computing operation recommendation or the computing operation associated with the digital request data object is automatically formatted for display, by the data engine, on a first graphical user interface based on the dynamic context data. In addition, a second set of computing operation recommendations associated with the second input may be automatically formatted for display on the first graphical interface based on the dynamic context data.

BRIEF DESCRIPTION OF THE DRAWINGS

The disclosure is illustrated by way of example, and not by way of limitation in the figures of the accompanying drawings in which like reference numerals are used to refer to similar elements. It is emphasized that various features may not be drawn to scale and the dimensions of various features may be arbitrarily increased or reduced for clarity of discussion. Further, some components may be omitted in certain figures for clarity of discussion.

FIGS. 4A and 4B shows an exemplary flowchart for methods, systems/apparatuses, and computer program products that generate dynamic context data associated with a digital request data object in a multi-application network such as the multi-application network of FIG. 1.

FIG. 5 shows an exemplary single interface for generating dynamic context data according to some embodiments.

DETAILED DESCRIPTION

Multi-Application Network

It is increasingly becoming needful to leverage computational tools that automatically recognize relationships among a plurality of disparate data associated with a given multi-application network, and suggest, estimate, or otherwise recommend operations that can be executed to make said disparate data more meaningful, insightful, and readily ingestible or accessible by other computing systems or applications for further processing or analysis. There is therefore a need to develop a digital assistant that can recommend operations based on data relationships in order to eliminate or otherwise minimize time constraints associated with computing operations within the multi-application network. Furthermore, the cost in terms of time, accuracy, and user experience (e.g., navigating multiple similar or dissimilar tools/interfaces) associated with data analysis can affect productivity and/or workflow efficiency, computational or otherwise, within the multi-application network.

Figure 1:
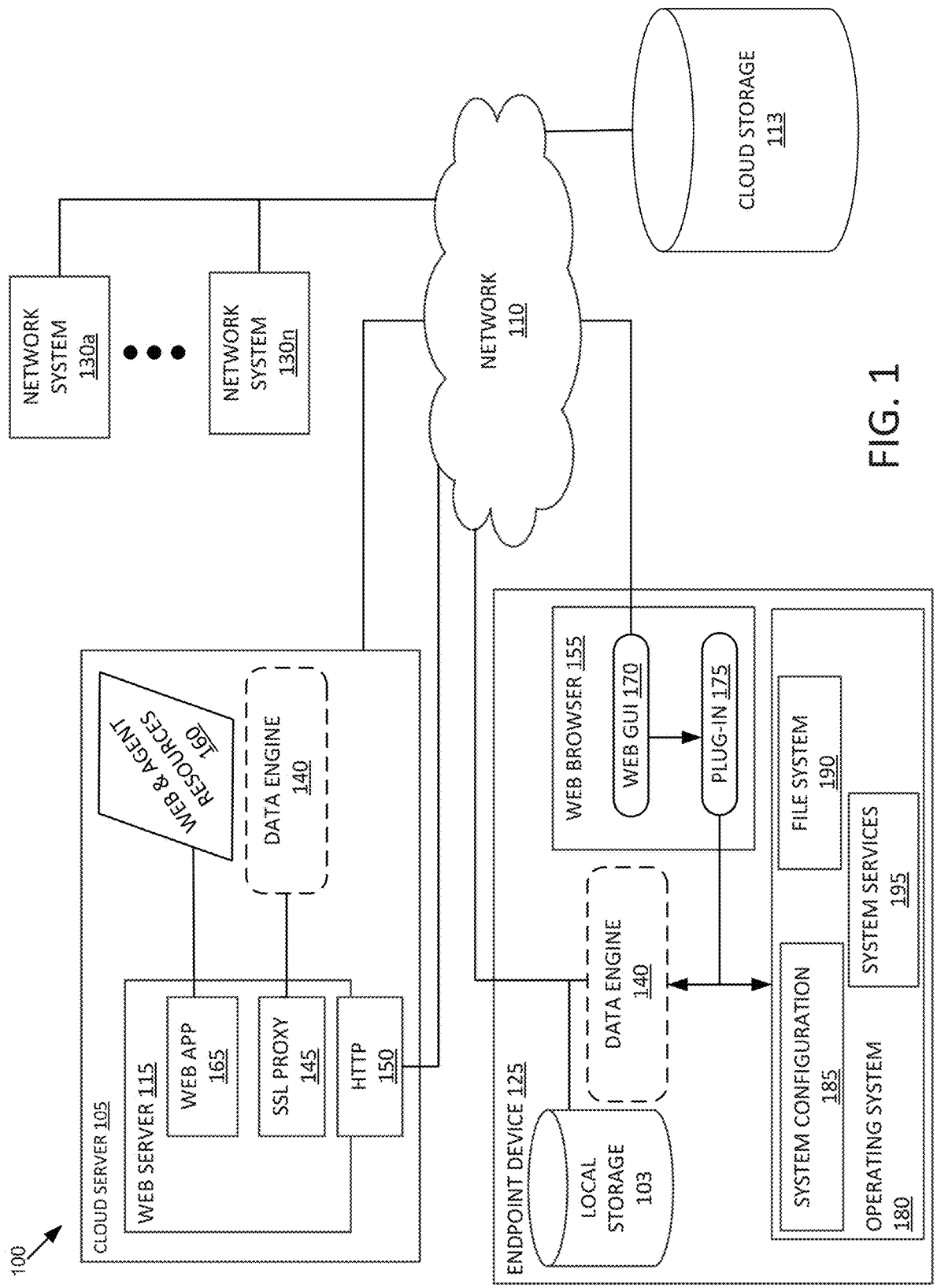
FIG. 1 is a high level diagram of an exemplary system indicting an implementation of a multi-application network, in accordance with some embodiments of this disclosure.

Illustrated in FIG. 1 is a high level diagram of an exemplary system 100 indicting an implementation of a multi-application network. In the illustrated implementation, the system 100 may include a cloud server 105 communicatively coupled to a plurality of network systems 130*a* . . . 130*n* via a network 110. The system 100 may also include an endpoint device 125 and cloud storage 113 communicatively coupled via the network 110. While a single cloud server 105 and a single endpoint device 125 are illustrated, the disclosed principles and techniques could be expanded to include multiple cloud servers, multiple endpoints, and multiple cloud storage devices.

In some embodiments, the cloud server 105 may include a computing device such as a mainframe server, a content server, a communication server, a laptop computer, a desktop computer, a handheld computing device, a smart phone, a wearable computing device, a tablet computing device, a virtual machine, a mobile computing device, a cloud-based computing solution and/or a cloud-based service, and/or the like. The cloud server 105 may include a plurality of computing devices configured to communicate with one another and/or implement the techniques described herein.

Figure 2:
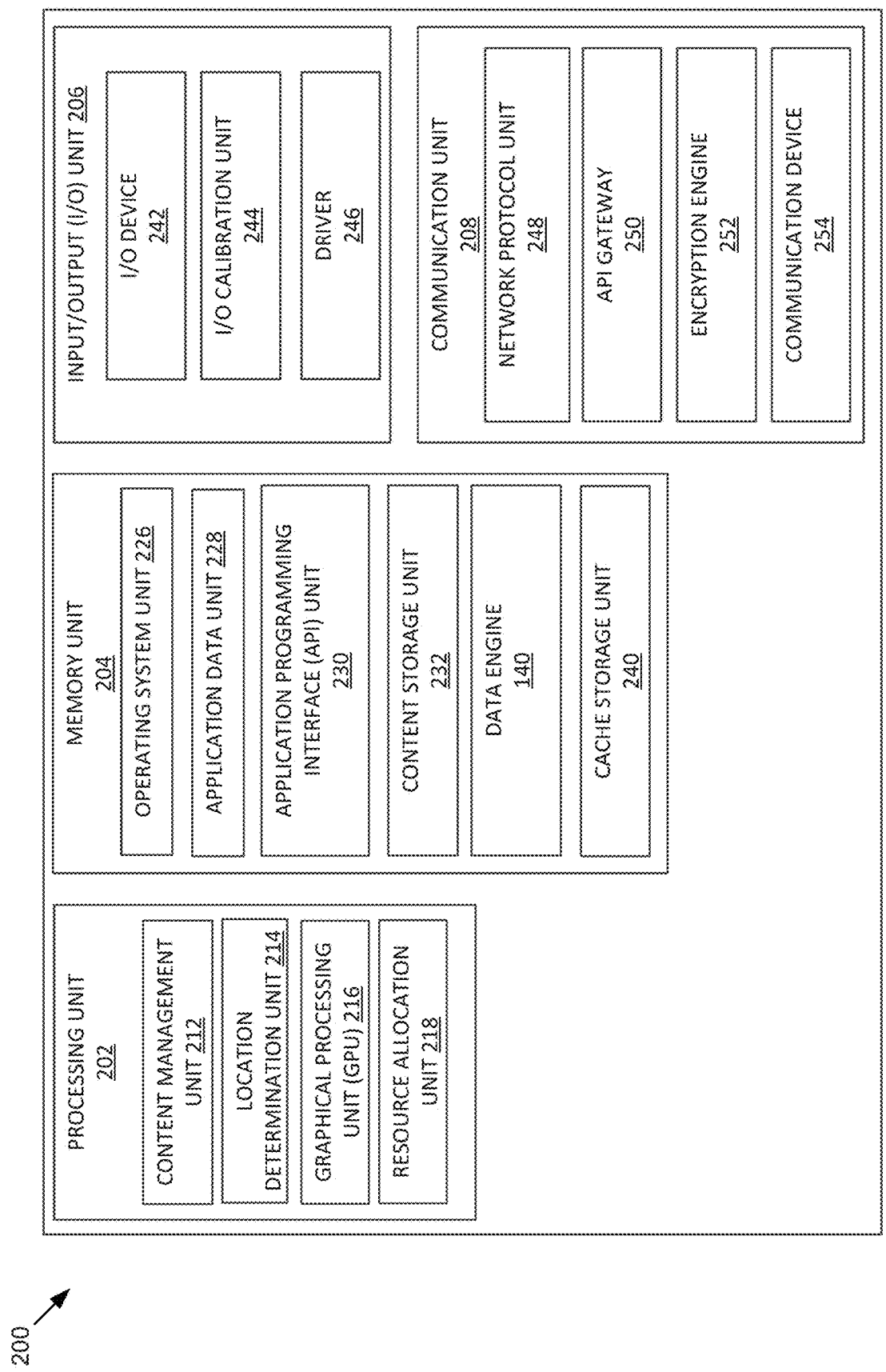
FIGS. 2 and 3 illustrate exemplary functional and system diagrams, respectively, of a computing environment for generating dynamic context data associated with a digital request data object in a multi-application network.
Figure 3:
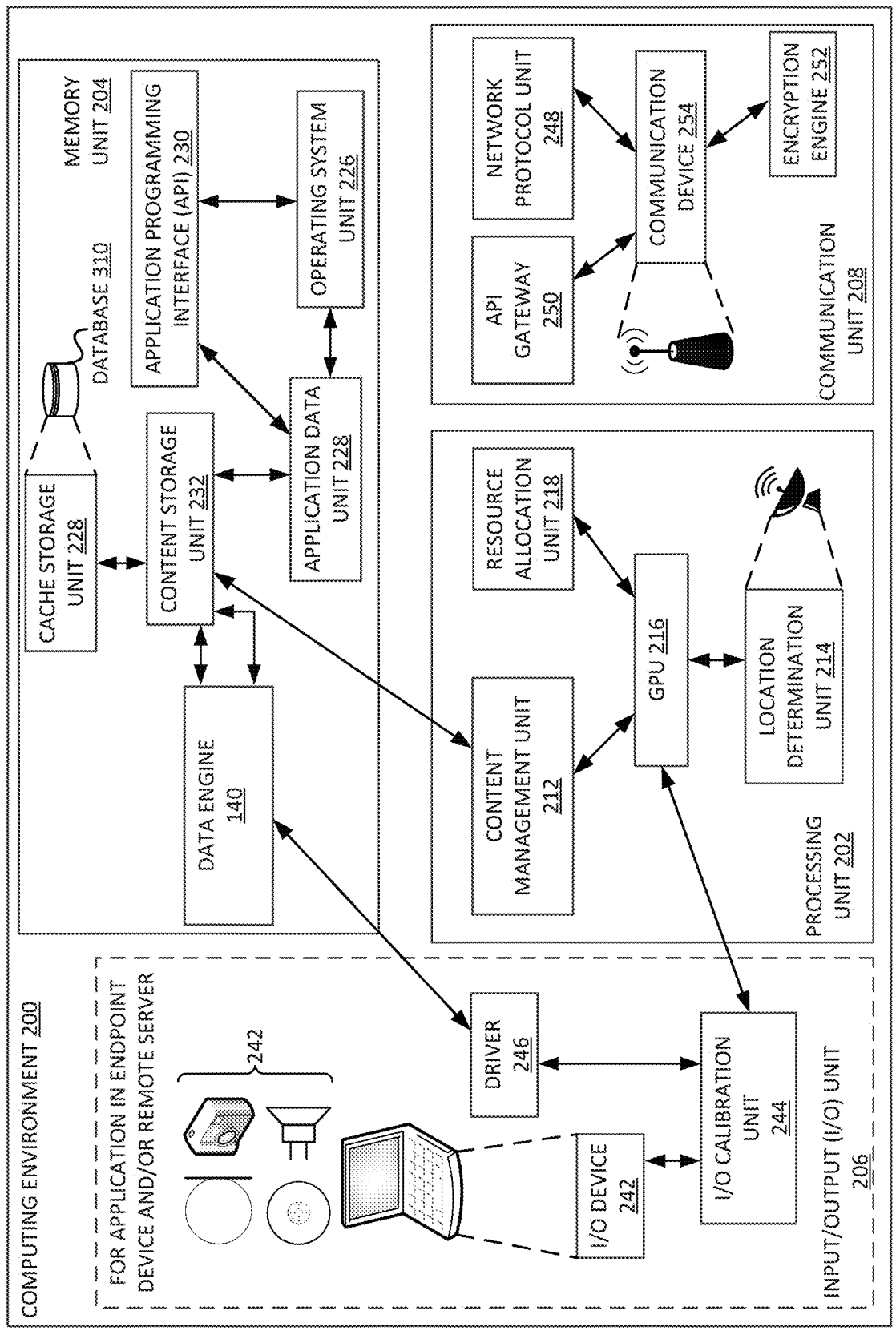

The cloud server 105 may include various elements of a computing environment as described in association with the computing environment 200 of FIGS. 2 and 3. For example, the cloud server 105 may include processing unit 202, a memory unit 204, an input/output (I/O) unit 206, and/or a communication unit 208 which are discussed in association with FIGS. 2 and 3. The cloud server 105 may further include subunits and/or other modules for performing operations associated with implementing a digital assistant in a multi-application network, registering a digital command in a multi-application network, generating dynamic context data associated with a digital request data object in a multi-application network, curating data associated with a multi-application network, and generating one or more digital records indicating computing operations and state data within a multi-application network. The cloud server may be locally or remotely operated as the case may require.

Turning back to FIG. 1, the cloud server 105 may include a web server 115, a data engine 140, and a web and agent resources 160. The web server 115, the data engine 140 and the web and agent resources 160 may be coupled to each other and to the network 110 via one or more signal lines. The one or more signal lines may comprise wired and/or wireless connections.

The web server 115 may include a secure socket layer (SSL) proxy 145 for establishing HTTP-based connectivity 150 between the cloud server 105 and other devices or systems coupled to the network 110. Other forms of secure connection techniques, such as encryption, may be employed on the web server 115 and across other systems coupled to the network 110. Additionally, the web server 115 may deliver artifacts (e.g., binary code, instructions, data, etc.) to the data engine 140 either directly via the SSL proxy 145 and/or via the network 110. Additionally, the web and agent resources 160 of the cloud server 105 may be provided to the endpoint device 125 via the web app 165 on the web server 115. The web and agent resources 160 may be used to render a web-based graphical interface (GUI) 170 via the browser 155 running on the endpoint device 125.

The data engine 140 may either be implemented on the cloud server 105 and/or on the endpoint device 125. The data engine 140 may include one or more instructions or computer logic that are executed by the one or more processors such as processors such as the processors discussed in association with FIGS. 2 and 3. In particular, the data engine facilitates executing the processing procedures, methods, techniques, and workflows provided in this disclosure. Some embodiments include an iterative refinement of one or more data models (e.g., learning model, large language model) associated with the multi-application network disclosed via feedback loops executed by one or more computing device processors and/or through other control devices or mechanisms that make determinations regarding optimization of a given action, template, or model.

In some embodiments, the data engine 140 may access an operating system 180 of the endpoint device 125 in order to execute the disclosed techniques on the endpoint device 125. For instance, the data engine 140 may gain access into the operating system 180 including the system configuration module 185, the file system 190, and the system services module 195 in order to execute computing operations associated with implementing a digital assistant in a multi-application network, registering a digital command in a multi-application network, generating dynamic context data associated with a digital request data object in a multi-application network, curating data associated with a multi-application network, and generating one or more digital records indicating computing operations and state data within a multi-application network. The plug-in 175 of the web browser 155 may provide needed downloads that facilitate operations executed by the operating system 180, the data engine 140, and/or other applications running on the endpoint device 125.

The network 110 may include a plurality of networks. For instance, the network 110 may include any wired and/or wireless communication network that facilitates communication between the cloud server 105, the cloud storage 113, and the endpoint device 125. The network 110, in some instances, may include an Ethernet network, a cellular network, a computer network, the Internet, a wireless fidelity (Wi-Fi) network, a light fidelity (Li-Fi) network, a Bluetooth network, a radio frequency identification (RFID) network, a near-field communication (NFC) network, a laser-based network, a 5G network, and/or the like.

The network systems 130*a* ... 130*n* may include one or more computing devices or servers, services, or applications the can be accessed by the cloud server 105 and/or the endpoint device 125 and or the cloud database 113 via the network 110. In one embodiment, the network systems 130*a* ... 130*n* comprises third-party applications or services that are native or non-native to either the cloud server 105 and/or the endpoint device 125. The third-party applications or services, for example, may facilitate executing one or more computing operations associated with resolving an exception event associated with a digital request data object. As further discussed below, the digital request data object may comprise a document or a file outlining one or more of: account data associated with a client request; or parametric data associated with resolving one or more exception events associated with the digital request data object. According to some implementations, the applications or services associated with the network systems 130*a* ... 130*n* and/or associated with the cloud server 105, and/or the endpoint device 125 must be registered to activate or otherwise enable their usage in the multi-application network. In such cases, the applications and/or services may be encapsulated in a registration object such that the registration object is enabled or activated for use by the data engine 140 based on one or more of: context data associated with a first user input; device profile data associated with a first interface through which the first user input was received; and user profile data associated with the user providing the first user input. On the flip side, the applications and/or services may be encapsulated in a registration object such that the registration object is deactivated or blocked from usage by data engine 140 based on one or more of: context data associated with a second user input; context data associated with a second input; device profile data associated with a second interface through which the second input was received; and user profile data associated with a user providing the second input. The first and second user inputs may both be textual or auditory and may comprise a natural language input.

Returning to FIG. 1, the cloud storage 113 may comprise one or more storage devices that store data, information and instructions used by the cloud server 105 and/or the endpoint device 125. The stored information may include information about users, information about data models (e.g., learning model, an artificial intelligence model, etc.), information about a digital assistant associated with the multi-application network, information associated with a digital request data object, information about analysis operations executed by the data engine 140, etc. In one embodiment, the one or more storage devices mentioned above in association with the cloud storage 113 can be non-volatile memory or similar permanent storage device and media. For example, the one or more storage devices may include a hard disk drive, a CD-ROM device, a DVD-ROM device, a DVD-RAM device, a DVD-RW device, a flash memory device, solid state media, or some other mass storage device known in the art for storing information on a more permanent basis. While the cloud storage 113 is shown as being coupled to the cloud server 105 and the endpoint device 125 via the network 110, the data in the cloud storage 113 may be replicated, in some embodiments, on the cloud server 105 and/or the endpoint device 125. That is to say that a local copy of the data in the cloud storage 113 may be stored on the cloud server 105 and/or the endpoint device 125. This local copy may be synched with the cloud storage 113 so that when there are any changes to the information in the cloud storage 113, the local copy on either the cloud server 105 or the endpoint device 125 is also similarly updated or synched in real-time or in near-real-time to be consistent with the information in the cloud storage 113 and vice versa.

Turning back to FIG. 1, the endpoint device 125 may be a handheld computing device, a smart phone, a tablet, a laptop computer, a desktop computer, a personal digital assistant (PDA), a smart device, a wearable device, a biometric device, a computer server, a virtual server, a virtual machine, a mobile device, and/or a communication server. In some embodiments, the endpoint device 125 may include a plurality of computing devices configured to communicate with one another and/or implement the techniques described in this disclosure. It is appreciated that according to some implementations, the endpoint device may be used by a user to access a digital assistant associated with the multi-application network for executing a plurality of operations associated with digital request data object. The data engine 140 may use the assistant to communicate with the user and to execute a plurality of analysis operations as further discussed below.

The local storage 103, shown in association with the endpoint device 125, may include one or more storage devices that store data, information, and instructions used by the endpoint device 125 and/or other devices coupled to the network 110. The stored information may include various logs/records or event files (e.g., exception event data associated with a digital request data object), security event data, etc. The one or more storage devices discussed above in association with the local database 103 can be non-volatile memory or similar permanent storage device and media. For example, the one or more storage devices may include a hard disk drive, a floppy disk drive, a CD-ROM device, a DVD-ROM device, a DVD-RAM device, a DVD-RW device, a flash memory device, solid state media, or some other mass storage device known in the art for storing information on a more permanent basis.

The other elements of the endpoint device 125 are discussed in association with the computing environment 200 of FIGS. 2 and 3. For example, elements such as a processing unit 202, a memory unit 204, an input/output (I/O) unit 206, and/or a communication unit 208 may execute one or more of the modules of endpoint device 125 and/or one or more elements of the cloud server 105 shown in FIG. 1. The endpoint device 125 may also include subunits and/or other computing instances as provided in this disclosure for performing operations associated with digital request data object and/or the multi-application network.

FIGS. 2 and 3 illustrate exemplary functional and system diagrams of a computing environment 200, according to some embodiments of this disclosure, for implementing a digital assistant in a multi-application network, registering a digital command in a multi-application network, generating dynamic context data associated with a digital request data object in a multi-application network, curating data associated with a multi-application network, and generating one or more digital records indicating computing operations and state data within a multi-application network. Specifically, FIG. 2 provides a functional block diagram of the computing environment 200, whereas FIG. 3 provides a detailed system diagram of the computing environment 200.

As seen in FIGS. 2 and 3, the computing environment 200 may include a processing unit 202, a memory unit 204, an I/O unit 206, and a communication unit 208. The processing unit 202, the memory unit 204, the I/O unit 206, and the communication unit 208 may include one or more subunits for performing operations described in this disclosure. Additionally, each unit and/or subunit may be operatively and/or otherwise communicatively coupled with each other and to the network 110. The computing environment 200 may be implemented on general-purpose hardware and/or specifically-purposed hardware as the case may be. Importantly, the computing environment 200 and any units and/or subunits of FIGS. 2 and/or 3 may be included in one or more elements of system 100 as described in association with FIG. 1. For example, one or more elements (e.g., units and/or subunits) of the computing environment 200 may be included in the cloud server 105 and/or the endpoint device 125 and/or the network systems 130a . . . 130n.

The processing unit 202 may control one or more of the memory unit 204, the I/O unit 206, and the communication unit 208 of the computing environment 200, as well as any included subunits, elements, components, devices, and/or functions performed by the memory unit 204, I/O unit 206, and the communication unit 208. The described sub-elements of the computing environment 200 may also be included in similar fashion in any of the other units and/or devices included in the system 100 of FIG. 1. Additionally, any actions described herein as being performed by a processor may be taken by the processing unit 202 of FIGS. 2 and 3 alone and/or by the processing unit 202 in conjunction with one or more additional processors, units, subunits, elements, components, devices, and/or the like. Further, while one processing unit 202 may be shown in FIGS. 2 and 3, multiple processing units may be present and/or otherwise included in the computing environment 200 or elsewhere in the overall system (e.g., system 100 of FIG. 1). Thus, while instructions may be described as being executed by the processing unit 202 (and/or various subunits of the processing unit 202), the instructions may be executed simultaneously, serially, and/or otherwise by one or multiple processing units 202 on one or more devices.

In some embodiments, the processing unit 202 may be implemented as one or more computer processing unit (CPU) chips and/or graphical processing unit (GPU) chips and may include a hardware device capable of executing computer instructions. The processing unit 202 may execute instructions, codes, computer programs, and/or scripts. The instructions, codes, computer programs, and/or scripts may be received from and/or stored in the memory unit 204, the I/O unit 206, the communication unit 208, subunits, and/or elements of the aforementioned units, other devices, and/or computing environments, and/or the like.

In some embodiments, the processing unit 202 may include, among other elements, subunits such as a content management unit 212, a location determination unit 214, a graphical processing unit (GPU) 216, and a resource allocation unit 218. Each of the aforementioned subunits of the processing unit 202 may be communicatively and/or otherwise operably coupled with each other.

The content management unit 212 may facilitate generation, modification, analysis, transmission, and/or presentation of content. Content may be file content, exception event content, content associated with a digital request data object, content associated with a registration object (e.g., a registration data object associated with registering a command or an application for use by the digital assistant), media content, security event content, or any combination thereof. In some instances, content on which the content management unit 212 may operate includes device information, user interface data, image data, text data, themes, audio data or audio files, video data or video files, documents, and/or the like. Additionally, the content management unit 212 may control the audio-visual environment and/or appearance of application data during execution of various processes (e.g., via web GUI 170 at the endpoint device 125). In some embodiments, the content management unit 212 may interface with a third-party content server (e.g., third-party content server associated with the network systems 130a . . . 130n), and/or specific memory locations for execution of its operations.

The location determination unit 214 may facilitate detection, generation, modification, analysis, transmission, and/or presentation of location information. Location information may include global positioning system (GPS) coordinates, an Internet protocol (IP) address, a media access control (MAC) address, geolocation information, a port number, a server number, a proxy name and/or number, device information (e.g., a serial number), an address, a zip code, and/or the like. In some embodiments, the location determination unit 214 may include various sensors, radar, and/or other specifically-purposed hardware elements for the location determination unit 214 to acquire, measure, and/or otherwise transform location information.

The GPU 216 may facilitate generation, modification, analysis, processing, transmission, and/or presentation of content described above, as well as any data described herein. In some embodiments, the GPU 216 may be utilized to render content for presentation on a computing device (e.g., via web GUI 170 at the endpoint device 125). The GPU 216 may also include multiple GPUs and therefore may be configured to perform and/or execute multiple processes in parallel.

The resource allocation unit 218 may facilitate the determination, monitoring, analysis, and/or allocation of computing resources throughout the computing environment 200 and/or other computing environments. For example, the computing environment may facilitate a high volume of data (e.g., data associated with a digital request data object or a registration object), to be processed and analyzed. As such, computing resources of the computing environment 200 used by the processing unit 202, the memory unit 204, the I/O unit 206, and/or the communication unit 208 (and/or any subunit of the aforementioned units) such as processing power, data storage space, network bandwidth, and/or the like may be in high demand at various times during operation. Accordingly, the resource allocation unit 218 may include sensors and/or other specially-purposed hardware for monitoring performance of each unit and/or subunit of the computing environment 200, as well as hardware for responding to the computing resource needs of each unit and/or subunit. In some embodiments, the resource allocation unit 218 may use computing resources of a second computing environment separate and distinct from the computing environment 200 to facilitate a desired operation. For example, the resource allocation unit 218 may determine a number of simultaneous computing processes and/or requests. The resource allocation unit 218 may also determine that the number of simultaneous computing processes and/or requests meet and/or exceed a predetermined threshold value. Based on this determination, the resource allocation unit 218 may determine an amount of additional computing resources (e.g., processing power, storage space of a particular non-transitory computer-readable memory medium, network bandwidth, and/or the like) required by the processing unit 202, the memory unit 204, the I/O unit 206, the communication unit 208, and/or any subunit of the aforementioned units for safe and efficient operation of the computing environment while supporting the number of simultaneous computing processes and/or requests. The resource allocation unit 218 may then retrieve, transmit, control, allocate, and/or otherwise distribute determined amount(s) of computing resources to each element (e.g., unit and/or subunit) of the computing environment 200 and/or another computing environment.

The memory unit 204 may be used for storing, recalling, receiving, transmitting, and/or accessing various files and/or data during operation of computing environment 200. For example, memory unit 204 may be used for storing, recalling, and/or updating exception event information as well as other data associated with, resulting from, and/or generated by any unit, or combination of units and/or subunits of the computing environment 200. In some embodiments, the memory unit 204 may store instructions, code, and/or data that may be executed by the processing unit 202. For instance, the memory unit 204 may store code that execute operations associated with one or more units and/or one or more subunits of the computing environment 200. For example, the memory unit may store code for the processing unit 202, the I/O unit 206, the communication unit 208, and for itself.

Memory unit 204 may include various types of data storage media such as solid state storage media, hard disk storage media, virtual storage media, and/or the like. Memory unit 204 may include dedicated hardware elements such as hard drives and/or servers, as well as software elements such as cloud-based storage drives. In some implementations, memory unit 204 may be a random access memory (RAM) device, a dynamic random access memory (DRAM) device, a static random access memory (SRAM) device, flash memory, read only memory (ROM) device, and/or various forms of secondary storage. The RAM device may be used to store volatile data and/or to store instructions that may be executed by the processing unit 202. For example, the instructions stored by the RAM device may be a command, a current operating state of computing environment 200, an intended operating state of computing environment 200, and/or the like. As a further example, data stored in the RAM device of memory unit 204 may include instructions related to various methods and/or functionalities described herein. The ROM device may be a non-volatile memory device that may have a smaller memory capacity than the memory capacity of a secondary storage. The ROM device may be used to store instructions and/or data that may be read during execution of computer instructions. In some embodiments, access to both the RAM device and ROM device may be faster to access than the secondary storage.

Secondary storage may comprise one or more disk drives and/or tape drives and may be used for non-volatile storage of data or as an over-flow data storage device if the RAM device is not large enough to hold all working data. Secondary storage may be used to store programs that may be loaded into the RAM device when such programs are selected for execution. In some embodiments, the memory unit 204 may include one or more databases 310 (shown in FIG. 3) for storing any data described herein. For example, depending on the implementation, the one or more databases may be used as the local record repository 103 of the endpoint device discussed with reference to FIG. 1. Additionally or alternatively, one or more secondary databases (e.g., the public record repository 113 discussed with reference to FIG. 1) located remotely from computing environment 200 may be used and/or accessed by memory unit 204. In some embodiments, memory unit 204 and/or its subunits may be local to the cloud server 105 and/or the endpoint device 125 and/or remotely located in relation to the cloud server 105 and/or the endpoint device 125.

Turning back to FIG. 2, the memory unit 204 may include subunits such as an operating system unit 226, an application data unit 228, an application programming interface (API) unit 230, a content storage unit 232, data engine 140, and a cache storage unit 240. Each of the aforementioned subunits of the memory unit 204 may be communicatively and/or otherwise operably coupled with each other and other units and/or subunits of the computing environment 200. It is also noted that the memory unit 204 may include other modules, instructions, or code that facilitate the execution of the techniques described. For instance, the memory unit 204 may include one or more modules such as a data engine discussed in association with FIGS. 4A and 4B.

The operating system unit 226 may facilitate deployment, storage, access, execution, and/or utilization of an operating system utilized by computing environment 200 and/or any other computing environment described herein. In some embodiments, operating system unit 226 may include various hardware and/or software elements that serve as a structural framework for processing unit 202 to execute various operations described herein. Operating system unit 226 may further store various pieces of information and/or data associated with the operation of the operating system and/or computing environment 200 as a whole, such as a status of computing resources (e.g., processing power, memory availability, resource utilization, and/or the like), runtime information, modules to direct execution of operations described herein, user permissions, security credentials, and/or the like.

The application data unit 228 may facilitate deployment, storage, access, execution, and/or utilization of an application used by computing environment 200 and/or any other computing environment described herein. For example, the endpoint device 125 may be required to download, install, access, and/or otherwise use a software application (e.g., web application 165) to facilitate implementing a digital assistant in a multi-application network, registering a digital command in a multi-application network, generating dynamic context data associated with a digital request data object in a multi-application network, curating data associated with a multi-application network, and generating one or more digital records indicating computing operations and state data within a multi-application network. As such, the application data unit 228 may store any information and/or data associated with an application. The application data unit 228 may further store various pieces of information and/or data associated with the operation of an application and/or computing environment 200 as a whole, such as status of computing resources (e.g., processing power, memory availability, resource utilization, and/or the like), runtime information, user interfaces, modules to direct execution of operations described herein, user permissions, security credentials, and/or the like.

The API unit 230 may facilitate deployment, storage, access, execution, and/or utilization of information associated with APIs of computing environment 200 and/or any other computing environment described herein. For example, computing environment 200 may include one or more APIs for various devices, applications, units, subunits, elements, and/or other computing environments to communicate with each other and/or utilize the same data. Accordingly, API unit 230 may include API databases containing information that may be accessed and/or utilized by applications, units, subunits, elements, and/or operating systems of other devices and/or computing environments. In some embodiments, each API database may be associated with a customized physical circuit included in memory unit 204 and/or API unit 230. Additionally, each API database may be public and/or private, and so authentication credentials may be required to access information in an API database. In some embodiments, the API unit 230 may enable the cloud server 105 and the endpoint device 125 to communicate with each other. It is appreciated that the API unit 230 may facilitate accessing, using the data engine 140, one or more applications or services on the cloud server 105 and/or the network systems 130*a* . . . 130*n*.

The content storage unit 232 may facilitate deployment, storage, access, and/or utilization of information associated with performance of implementing operations associated with a multi-application network and/or framework processes by computing environment 200 and/or any other computing environment described herein and/or framework processes by computing environment 200 and/or any other computing environment described herein. In some embodiments, content storage unit 232 may communicate with content management unit 212 to receive and/or transmit content files (e.g., media content, digital request data object content, command content, input content, registration object content, etc.).

As previously discussed, the data engine 140 facilitates executing the processing procedures, methods, techniques, and workflows provided in this disclosure. In particular, the data engine 140 may be configured to execute computing operations associated with the disclosed methods, systems/apparatuses, and computer program products.

The cache storage unit 240 may facilitate short-term deployment, storage, access, analysis, and/or utilization of data. In some embodiments, cache storage unit 240 may serve as a short-term storage location for data so that the data stored in cache storage unit 240 may be accessed quickly. In some instances, cache storage unit 240 may include RAM devices and/or other storage media types for quick recall of stored data. Cache storage unit 240 may include a partitioned portion of storage media included in memory unit 204.

The I/O unit 206 may include hardware and/or software elements for the computing environment 200 to receive, transmit, and/or present information useful for performing the disclosed processes. For example, elements of the I/O unit 206 may be used to receive input from a user of the endpoint device 125. As described herein, I/O unit 206 may include subunits such as an I/O device 242, an I/O calibration unit 244, and/or driver 246.

The I/O device 242 may facilitate the receipt, transmission, processing, presentation, display, input, and/or output of information as a result of executed processes described herein. In some embodiments, the I/O device 242 may include a plurality of I/O devices. In some embodiments, I/O device 242 may include a variety of elements that enable a user to interface with computing environment 200. For example, I/O device 242 may include a keyboard, a touchscreen, a button, a sensor, a biometric scanner, a laser, a microphone, a camera, and/or another element for receiving and/or collecting input from a user. Additionally and/or alternatively, I/O device 242 may include a display, a screen, a sensor, a vibration mechanism, a light emitting diode (LED), a speaker, a radio frequency identification (RFID) scanner, and/or another element for presenting and/or otherwise outputting data to a user. In some embodiments, the I/O device 242 may communicate with one or more elements of processing unit 202 and/or memory unit 204 to execute operations associated with the disclosed techniques and systems.

The I/O calibration unit 244 may facilitate the calibration of the I/O device 242. For example, I/O calibration unit 244 may detect and/or determine one or more settings of I/O device 242, and then adjust and/or modify settings so that the I/O device 242 may operate more efficiently. In some embodiments, I/O calibration unit 244 may use a driver 246 (or multiple drivers) to calibrate I/O device 242. For example, the driver 246 may include software that is to be installed by I/O calibration unit 244 so that an element of computing environment 200 (or an element of another computing environment) may recognize and/or integrate with I/O device 242 for the processes described herein.

The communication unit 208 may facilitate establishment, maintenance, monitoring, and/or termination of communications between computing environment 200 and other computing environments, third party server systems, and/or the like (e.g., between the cloud server 105 and the endpoint device 125 and or the network systems 130*a* . . . 130*n*). Communication unit 208 may also facilitate internal communications between various elements (e.g., units and/or subunits) of computing environment 200. In some embodiments, communication unit 208 may include a network protocol unit 248, an API gateway 250, an encryption engine 252, and/or a communication device 254. Communication unit 208 may include hardware and/or other software elements.

The network protocol unit 248 may facilitate establishment, maintenance, and/or termination of a communication connection for computing environment 200 by way of a network. For example, the network protocol unit 248 may detect and/or define a communication protocol required by a particular network and/or network type. Communication protocols used by the network protocol unit 248 may include Wi-Fi protocols, Li-Fi protocols, cellular data network protocols, Bluetooth® protocols, WiMAX protocols, Ethernet protocols, powerline communication (PLC) protocols, and/or the like. In some embodiments, facilitation of communication for computing environment 200 may include transforming and/or translating data from being compatible with a first communication protocol to being compatible with a second communication protocol. In some embodiments, the network protocol unit 248 may determine and/or monitor an amount of data traffic to consequently determine which particular network protocol is to be used for establishing a secure communication connection, transmitting data, and/or performing malware scanning operations and/or other processes described herein.

The API gateway 250 may allow other devices and/or computing environments to access the API unit 230 of the memory unit 204 associated with the computing environment 200. For example, an endpoint device 125 may access the API unit 230 of the computing environment 200 via the API gateway 250. In some embodiments, the API gateway 250 may be required to validate user credentials associated with a user of the endpoint device 125 prior to providing access to the API unit 230 to a user. The API gateway 250 may include instructions for the computing environment 200 to communicate with another computing device and/or between elements of the computing environment 200.

Exemplary Embodiment

Processing or analyzing data in a multi-application network may involve the use of a plurality of technologies or applications associated one or more domains, sectors, processing stages, and/or workflow stages or sub-stages associated with a digital request data object. According to one embodiment, the digital request data object comprises a file, or a document, or a record, or profile data associated with a user request, or profile data associated with a digital service comprised in or associated with the multi-application network. It is appreciated that the file, the document, record, profile data associated with a user request, or profile data associated with a service comprised in, or associated with the multi-application network outlines or is associated with one or more of: account data associated with the digital request data object; or parametric data associated with resolving one or more exception events associated with the digital request data object. According to one embodiment, the multi-application network may: connect a plurality of users via one or more computer networks such as those discussed above in association with FIGS. 1, 2, and 3; include computational capabilities that improve user experience; include one or more analysis operations comprising workflows/logic associated with one or more applications; and include a machine learning or an artificial intelligence engine or module drives context identification associated with a digital request data object and allows further customized interrogation of the multi-application network based on identified context. In some embodiments, the disclosed multi-application network is scalable, and can condense multiple user interfaces into a single user interface based on the digital context associated with a given digital request data object to allow optimized and otherwise seamless generation of analysis data or computing results associated with the processing stages associated with the digital request data object. Moreover, the analysis data, computing results, or context or intent data associated with the digital request data object may be displayed on a single interface thereby negating the laborious process of a user navigating between a plurality of applications and/or interfaces associated with a plurality of applications generating the analysis data, computing results, or context data. This may be achieved by the user interacting with a digital assistant of the multi-application network such that the digital assistant automatically evaluates user inputs (e.g., textual or audio natural language inputs) and intelligently engages applications associated with the multi-application network to execute the needed process for the various processing stages associated with resolving one or more exception events associated with the digital request data object. For example, the digital assistant may comprise or be associated with an artificial or machine learning engine which adapts to, or intelligently uses the user inputs by leveraging context data associated with one or more of: a user profile; the user inputs; one or more digital request data objects; or an exception event associated with the one or more digital request data objects.

The exception event, for example, may comprise a disruption in processing a digital request data object at a particular processing stage based on the digital request data object's failure to meet certain requirements or criteria at said stage. For example, some of the requirements may include: a lack of additional input from a user associated with the digital request data object; profile data of the user associated with the digital request data object; a lack of analysis data or computing results data from other applications associated with the multi-application network; a time threshold required to process the digital request data object; profile data associated with a device on which the digital request data object is being processed; credential data associated with a user of the multi-application network; lack of context data associated with the digital request data object; lack of client profile data associated with a client corresponding to the digital request data object.

According to one embodiment, the multi-application network provides users with a functionality to operate on one or more requests (e.g., digital requests data objects) regardless of status (e.g., exception event status) of said requests in a user-friendly and context-enabled machine learning user interface. The multi-application network can provide a user with relevant data based on a digital context within which the user is interacting or communicating with the digital assistant of the multi-application network. In one embodiment, the multi-application network can generate a context-specific interface based on the type of inquiry or operations associated with inputs being received so that a user does not need to actively navigate to multiple user interfaces or access relevant data processing applications that interpret or otherwise analyze data at a given processing stage of a digital request data object. In some embodiments, an application programming interface (API) such as those discussed in conjunction with FIGS. 2 and 3 facilitates the selection of relevant programs or digital logic for processing data associated with the digital request data object based on the digital context.

According to some embodiments, the multi-application network enables automating exception event detection associated with one or more digital request data objects with little to no user intervention using APIs that access and process stage-specific or domain-specific applications associated with the digital request data object. Results from such processes may be presented together with one or more recommendations on possible operations or workflows to execute to resolve and or track an identified exception on a single graphical user interface associated with the multi-application network. According to one embodiment, an identified of the digital request data object indicates a digital event, a digital disruption, a data anomaly, or data condition that needs to be resolved or satisfied for a stage-wise progression of the digital request data object, for example, to move the digital request data object to a different processing stage associated with the digital request data object. In one embodiment, the multi-application network can improve efficiency of operations, computing or otherwise, within the multi-application network by decreasing:

1) the cognitive load for teams (e.g., Agile team) using the multi-application network,
2) back-office (full-time equivalent FTE) operations associated with the multi-application network by at least 25%, and
3) user training time associated with the multi-application network by at least half of the time required to train users without the multi-application network.

Furthermore, the multi-application network can increase cross-domain data fungibility or cross-specialty data fungibility or cross-stage data fungibility associated with the digital request data object.

The disclosed technology beneficially provides a broad set of functionalities by developing, delivering, and releasing distributed and stand-alone solutions for inter-domain, inter-stage data management through the use of a single multi-application network. Furthermore, the disclosed methods and systems provide a conversational architecture to facilitate interactions between a user and the multi-application network using a digital assistant. In particular, the multi-application network can receive natural language queries/inputs associated with a digital request data object from a user, analyze said natural language queries and provide workflow recommendations as well as other responses associated said natural language queries. In some embodiments, the multi-application network can generate intent or context data indicating a digital context associated with the natural language queries and/or associated with a given digital request data object to generate one or more workflow recommendations and/or link a user query/input to one or more digital request data objects and/or applications. It is appreciated that the multi-application network can maintain a digital context associated with a given digital request data object based on one or more of a digital request of a client, a user input from a user, or a digital request data object associated with the user input. According to some embodiment, the multi-application network can curate data based on a profile of a user (e.g., a digital profile of a user), a digital profile of the digital request data object, a digital profile of a computing device being used by the user, location data of a user, and other security protocols associated with the user and/or the digital request data object. It is appreciated that the multi-application network may facilitate implementing a digital assistant, executing registration operations for digital commands, executing context awareness operations, executing operations associated with curating data, and executing operations associated with generating analysis reports or receipts responsive to executing one or more computing operations associated with a digital request data object and/or registration object associated with registering a command.

Context Awareness

According to some embodiments, the multi-application network includes a context awareness feature that customizes or otherwise presents (e.g., on a single graphical interface) information relevant to a context in which a digital request data object is being accessed, and/or context associated with operations being executed on a digital request data object, and/or context associated with a specific user or a specific group of users accessing and/or operating on a given digital request data object. In particular, the user experience of a user using the multi-application network is heavily driven by context data associated with a digital request data object. In some embodiment, once a digital request data object (or information associated with the digital request data object) is loaded or accessed or retrieved from a database of the multi-application network, previously generated context data may also be loaded or accessed or retried to inform or otherwise guide the next set of operations to which the digital request data object can be subjected. In addition, the previously generated context data (also referred to as static context data elsewhere herein) may be updated to generate dynamic context data after one or more computing operations associated with the digital request data object have been executed in response to loading the digital request data object. Such dynamic context data may comprise a series of real-time or near real-time dynamic updates to the dynamic context data. After one or more of such updates have been executed on the dynamic context data, the dynamic context data may be stored in which case it reverts to being static context data associated with the digital request data object. According to one embodiment, the multi-application network via, a digital assistant, for example, can track user activity associated with a given digital request data object to refine or update context data associated with said digital request data object. Said refined or updated context data may drive the aggregation of one or more computing operations, and/or other relevant data that may be required to analyze and/or augment the digital request data object from one processing stage to another. These aspects are discussed below in association with FIGS. 4A and 4B.

Flowchart

Figure 4A:
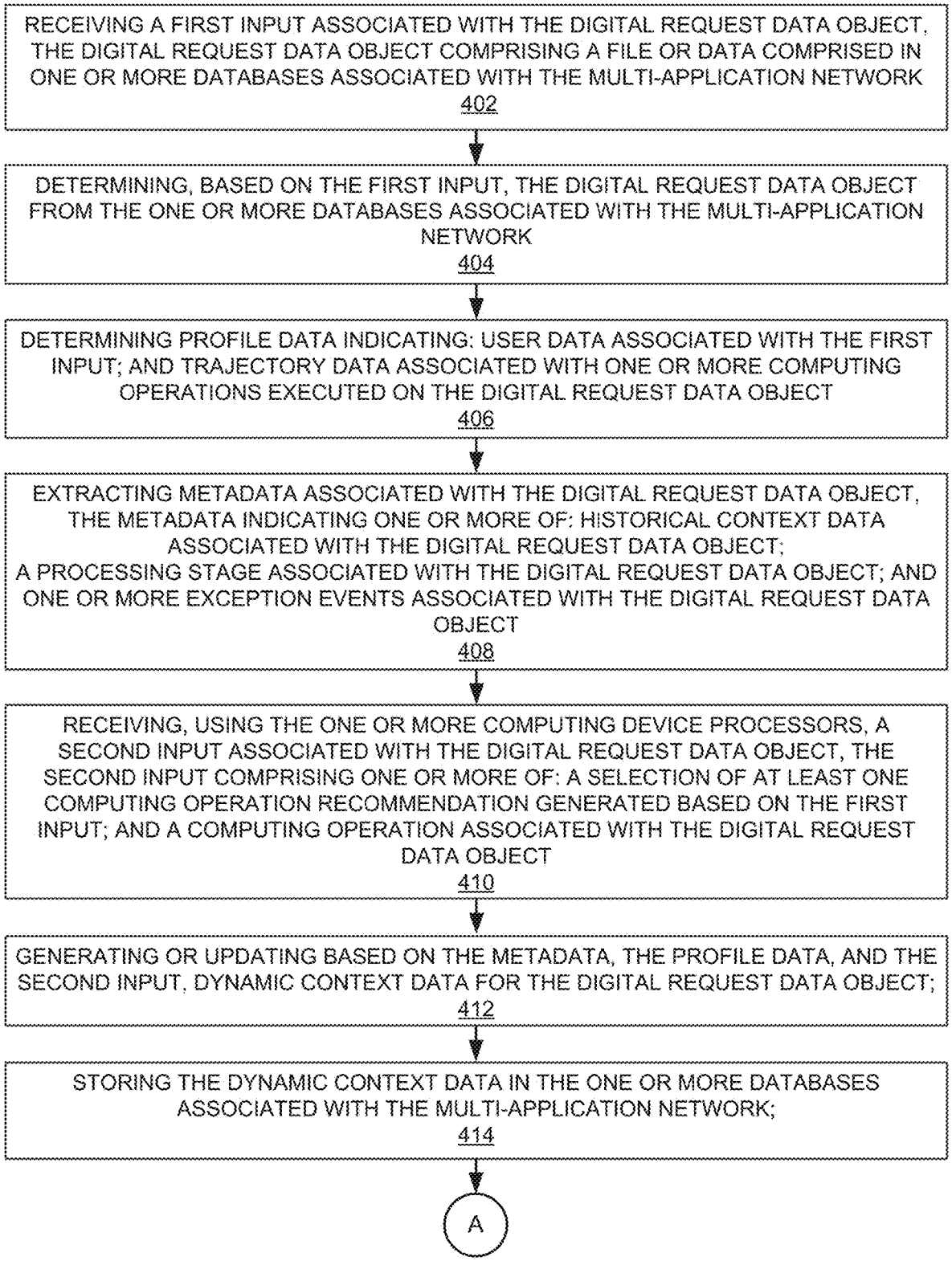

FIGS. 4A and 4B shows an exemplary flowchart for methods, systems/apparatus, or computer program products for generating dynamic context data associated with a digital request data object in a multi-application network. It is appreciated that a data engine stored in a memory device may cause a computer processor to execute the various processing stages of FIGS. 4A and 4B. At block 402, the data engine may receive a first input associated with the digital request data object. The digital request data object may comprise a file comprised in or associated with one or more databases of the multi-application network. In addition, the first input may include a natural language input such as one or more textual data or character strings associated with spoken and/or written language (e.g., English language, French language, Portuguese language, Chinese language, Japanese language, Korean language, Dutch language, etc.).

At block 404, the data engine may determine, based on the first input, the digital request data object from the one or more databases associated with the multi-application network. In one embodiment, the digital request data object may a comprise a file, or a document, or a record, or profile data associated with a user request (e.g., a digital request data object), or profile data associated with a digital service comprised in or associated with the multi-application network. The file, document, record, or profile data associated with the digital request data object, or profile data associated with a service comprised in, or associated with the multi-application network can outline or be associated with one or more of: account data associated with the digital request data object; or parametric data associated with resolving one or more exception events associated with the digital request data object.

At block 406, the data engine may determine, profile data indicating one or more of user data associated with the first input, and/or trajectory data associated with one or more computing operations executed on the digital request data object. The user data comprised in the profile data, for example, may comprise access data including an access protocol for a user that defines specific aspects of the digital request data object that is accessible to the user. The trajectory data may indicate or link one or more computing operations previously executed on the digital request data object to generate a computing operation sequence that informs selection of future computing operations for the digital request data object.

Continuing to block 408, the data engine may extract, metadata associated with the digital request data object. The metadata may indicate one or more of: historical context data associated with the digital request data object, a processing stage associated with the digital request data object; or one or more exception events associated with the digital request data object. In some embodiments, the historical context data indicates one or more of an exception event or a processing stage associated with the digital request data object. At block 410, the data engine may receive, a second input associated with the digital request data object. The second input may comprise one or more of a selection of at least one computing operation recommendation generated based on the first input, or a computing operation associated with the digital request data object. At block 412, the data engine may generate or update dynamic context data based on one or more of: the metadata, the profile data, and the second input. At block 414, the data engine may store, the dynamic context data in the one or more databases associated with the multi-application network. It is appreciated that the static and/or dynamic context data drive the transformation of one or more display elements on a single graphical interface associated with the multi-application network. Said display elements may include identifiers associated with the multi-application network and/or identifiers associated with the parameters of the digital request data object.

At block 416, the data engine may initiate, using the one or more computing device processors, presentation of the dynamic context data for the digital request data object simultaneously with initiating presentation of an input area for receiving a third input associated with the digital request data object. The third input, for example, may comprise one or more of: a selection of at least one second computing operation recommendation generated based on the second input, and a second computing operation associated with the digital request data object.

These and other implementations may each optionally include one or more of the following features. In some embodiments, the profile data comprises device data associated with a computing device from which the first input was received. Furthermore the computing operation associated with the digital request data object comprises a computing command that resolves a first exception event comprised in the one or more exception events associated with the digital request data object. In addition, generating the dynamic context data based on the metadata, the profile data, and the second input comprises: scanning the metadata and the profile data to generate static context data; and linking the static context data to at least one computing operation executed on the digital request object based on the second input to generate the dynamic context data.

In some embodiments, analyzing the first input comprises resolving the first input comprising a natural language input into one or more data strings and applying semantic or syntactic data to the one or more data strings to generate a plurality of computing operation recommendations including the at least one computing operation recommendation. In one embodiment, the data string comprises a sequence of characters including letters, numbers, symbols, and even spaces associated with written or spoken language. The data engine, may, according to some embodiments, automatically format the digital request data object for display on a first graphical user interface based on the dynamic context data. Moreover, a second set of computing operation recommendations associated with the second input may also be automatically formatted for display on the first graphical interface based on the dynamic context data. According to some embodiments, the second input is associated with a computing operation for analyzing, solving, addressing, or managing a detected exception event associated with the digital request data object. In addition, the dynamic context data can comprise an update to static context data derived from one or more of the metadata or the profile data.

FIG. 5 shows an exemplary single interface (e.g., dynamic single interface) for generating dynamic context data according to some embodiments. The single interface can comprise an interrogator control input field 502 through which one or more textual or auditory inputs may be received. The textual and/or auditory input may comprise a natural language input from the user. In the case of a textual input, a keyboard, mouse, a touchscreen, or some other input device may facilitate the entry of the textual input. The auditory input on the other hand may be received using an input device such as a microphone. It is appreciated that the textual or auditory input can comprise one or more inputs (e.g., input command) from a user. After an input is received from a user via the interrogator control input field, a digital assistant associated with the multi-application network can analyze, using an artificial intelligence or a machine learning language model, the input to determine a digital request data object 504 associated with the input command. In one embodiment, the initial input comprises identifier data associated with the digital request data object. The identifier data associated with the digital request data object informs or otherwise guides the digital assistant to retrieve, generate, or display a summary information 506 associated with the digital request data object. It is appreciated that the summary information 506 may include identifier or qualitative data associated with the digital request data object, quantitative data associated with the digital request data object, and/or exception event data associated with the digital request data object.

Furthermore, intent data or context data (e.g., previously generated intent or context data) associated with the digital request data object may also be displayed in the context section 508 of the single user interface. According to one embodiment, the data presented under the context section 508 of the single user interface comprises a summary of the previously generated context data. Furthermore, the context data may be organic in that is dynamically updated based on one or more of: the types of computing operations to which the digital request data object is subjected to; a user profile of the user accessing the digital request data object; a device profile of the computing device through which the digital request data object is accessed; location data associated with the computing device through which the digital request data object is accessed; and processing stage data associated with resolving one or more exception events associated with the digital request data.

Furthermore, the context data may be applied to a trajectory model associated with the multi-application network. In addition, the trajectory model may be comprised in a digital assistant of the multi-application network such that the trajectory model is powered by an artificial intelligence engine. For example, the trajectory model may be configured to track or assimilate a trajectory of a plurality of input commands including the first input command leading to a selection of specific computing operation recommendations on a single unified interface associated with the digital request data object.

It is appreciated that the digital request data object may comprise a file or document indicating a loan request, a request to process medical registration data, a request to process student data associated with an educational institution, a request to process scientific data associated with a research, etc.

This patent application incorporates by reference the following commonly owned applications, naming the same inventors, and filed on the same date as the present application (note that the list includes the present application): (1) U.S. patent application Ser. No. 18/373,771, titled "Methods And Systems For Implementing An Intelligent Digital Assistant In A Multi-Application Network," filed on Sep. 27, 2023; (2) U.S. patent application Ser. No. 18/373,797, titled "Methods And Systems For Registering A Digital Command In A Multi-Application Network," filed on Sep. 27, 2023; (3) U.S. patent application Ser. No. 18/373,813, titled "Methods And Systems For Generating Dynamic Context Data Associated With A Digital Request Data Object In A Multi-Application Network," filed on Sep. 27, 2023; (4) U.S. patent application Ser. No. 18/373,822, titled "Methods And Systems For Curating Data In A Multi-Application Network," filed on Sep. 27, 2023; and (5) U.S. patent application Ser. No. 18/373,830, titled "Methods And Systems For Generating Digital Records Indicating Computing Operations And State Data In A Multi-Application Network," filed on Sep. 27, 2023.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to explain the principles of the disclosed subject-matter and its practical applications, to thereby enable others skilled in the art to use the technology disclosed and various embodiments with various modifications as are suited to the particular use contemplated. It is appreciated that the term optimize/optimal and its variants (e.g., efficient or optimally) may simply indicate improving, rather than the ultimate form of 'perfection' or the like.

Furthermore, the functions or operations described above can be implemented in digital electronic circuitry, in computer software, firmware or hardware. In particular, the disclosed techniques can be implemented using one or more computer program products. The computer program products, in some embodiments, comprises non-transitory computer-readable media comprising code configured to execute the disclosed approach. Programmable processors and computers can be included in or packaged as mobile devices according to some embodiments. The processes and logic flows can be performed by one or more programmable processors and by one or more programmable logic circuitry. General and special purpose computing devices and storage devices can be interconnected through communication networks.

It will also be understood that, although the terms first, second, etc., may be used herein to describe various elements, these elements should not be limited by these terms. These terms are used to distinguish one element from another. For example, a first object or step could be termed a second object or step, and, similarly, a second object or step could be termed a first object or step, without departing from the scope of the invention. The first object or step, and the second object or step, are both objects or steps, respectively, but they are not to be considered the same object or step.

The terminology used in the description herein is for the purpose of describing particular embodiments and is not intended to be limiting. As used in the description of the invention and the appended claims, the singular forms "a," "an" and "the" are intended to include the plural forms as well, unless the context clearly indicates otherwise. It will also be understood that the term "and/or" as used herein refers to and encompasses any possible combination of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context.

Those with skill in the art will appreciate that while some terms in this disclosure may refer to absolutes, e.g., all source receiver traces, each of a plurality of objects, etc., the methods and techniques disclosed herein may also be performed on fewer than all of a given thing, e.g., performed on one or more components and/or performed on one or more source receiver traces. Accordingly, in instances in the disclosure where an absolute is used, the disclosure may also be interpreted to be referring to a subset.

What is claimed is:

1. A method for generating or updating context data associated with a digital request data object in a multi-application network, the method comprising:

receiving, using one or more computing device processors, a first input associated with the digital request data object, the digital request data object comprising a file or data comprised in one or more databases associated with the multi-application network;

determining, using the one or more computing device processors, based on the first input, the digital request data object from the one or more databases associated with the multi-application network;

determining, using the one or more computing device processors, profile data indicating:
user data associated with the first input, and
first data associated with one or more computing operations executed on the digital request data object;

extracting, using the one or more computing device processors, metadata associated with the digital request data object, the metadata indicating one or more of:
historical context data associated with the digital request data object,
a processing stage associated with the digital request data object, and
one or more exception events associated with the digital request data object;

receiving, using the one or more computing device processors, a second input associated with the digital request data object, the second input comprising one or more of:
a selection of at least one computing operation recommendation generated based on the first input, and
a computing operation associated with the digital request data object;

generating or updating, using the one or more computing device processors, based on the metadata, the profile data, and the second input, context data for the digital request data object;

storing, using the one or more computing device processors, the context data in the one or more databases associated with the multi-application network;

initiating, using the one or more computing device processors, presentation of the context data for the digital request data object simultaneously with initiating, using the one or more computing device processors, presentation of an input area for receiving, using the one or more computing device processors, a third input associated with the digital request data object, the third input comprising one or more of:

a selection of at least one second computing operation recommendation generated based on the second input, and a second computing operation associated with the digital request data object; and determining a first exception event comprised in the one or more exception events associated with the digital request data object, wherein the first exception event comprise a disruption in processing the digital request data object during a first stage based on the digital request data object not meeting a requirement or condition during the first stage, and wherein the requirement or condition is based on at least one of: first additional input, or an absence or partial absence of second additional input, associated with the digital request data object; the profile data for the digital request data object; first analysis data or first computing result data, or an absence or partial absence of second analysis data or second computing result data, from other applications associated with the multi-application network; a time threshold for processing the digital request data object; device profile data associated with a device associated with the digital request data object; credential data associated with a user of the multi-application network or associated with the digital request data object; the context data, or an absence or partial absence of second context data, for the digital request data object; or first client profile data, or an absence or partial absence of second profile data associated with a client associated with the digital request data object.

2. The method of claim 1, wherein one of:
the updating comprises updating portions of previously stored context data or replacing the previously stored context data in its entirety, and
the profile data comprises device data associated with a computing device from which the first input was received.

3. The method of claim 1, wherein the computing operation associated with the digital request data object comprises a computing command that resolves the first exception event comprised in the one or more exception events associated with the digital request data object.

4. The method of claim 1, wherein generating, based on the metadata, the profile data, and the second input, the context data for the digital request data object comprises:
scanning the metadata and the profile data to generate other context data.

5. The method of claim 1, wherein the first input associated with the digital request data object is a natural language input.

6. The method of claim 5, wherein analyzing the first input comprises:
applying semantic or syntactic data to one or more data strings to generate a plurality of computing operation recommendations including the at least one computing operation recommendation.

7. The method of claim 1, wherein the digital request data object comprises a document or a file outlining one or more of:
account data associated with a client request, or
data associated with resolving an exception event associated with the digital request data object.

8. The method of claim 1, wherein the second input is associated with the computing operation for analyzing, solving, addressing, or managing a detected exception event associated with the digital request data object.

9. The method of claim 1, wherein:
a first computing operation result associated with the selection of the at least one computing operation recommendation or the computing operation associated with the digital request data object is automatically formatted for display on a first graphical user interface based on the context data; and
a second set of computing operation recommendations associated with the second input is automatically formatted for display on the first graphical user interface based on the context data.

10. An apparatus for generating or updating context data associated with a digital request data object in a multi-application network, the apparatus comprising:
one or more computing system processors; and
memory storing instructions that, when executed by the one or more computing system processors, causes the apparatus to:
determine, based on a first input, the digital request data object from one or more databases associated with the multi-application network;
determine, profile data indicating one or more of:
user data associated with the first input, and
first data associated with one or more computing operations executed on the digital request data object;
extract metadata associated with the digital request data object, the metadata indicating one or more of:
historical context data associated with the digital request data object,
a processing stage associated with the digital request data object, or
one or more exception events associated with the digital request data object;
receive a second input associated with the digital request data object, the second input comprising one of:
a selection of at least one computing operation recommendation generated based on the first input, and
a computing operation associated with the digital request data object;
generate or update, based on the metadata, the profile data, and the second input, context data for the digital request data object;
store the context data in the one or more databases associated with the multi-application network;
initiate presentation of the context data for the digital request data simultaneously with initiate presentation of an input area for receiving a third input associated with the digital request data object, the third input comprising one or more of:
a selection of at least one second computing operation recommendation generated based on the second input, and
a second computing operation associated with the digital request data object; and
determine a first exception event comprised in the one or more exception events associated with the digital request data object,
wherein the first exception event comprise a disruption in processing the digital request data object during a first stage based on the digital request data object not meeting a requirement or condition during the first stage, and wherein the requirement or condition is based on at least one of: first additional input, or an absence or partial absence of second additional input, associated with the digital request data object; the profile data for the digital request data object; first analysis data or first computing result data, or an absence or partial absence of second analysis data or second computing result data, from other applications associated with the multi-application network; a time threshold for processing the digital request data object; device profile data associated with a device associated with the digital request data object; credential data associated with a user of the multi-application network or associated with the digital request data object; the context data, or an absence or partial absence of second context data, for the digital request data object; or first client profile data, or an absence or partial absence of second profile data associated with a client associated with the digital request data object.

11. The apparatus of claim 10, wherein the profile data comprises device data associated with a computing device from which the first input was received.

12. The apparatus of claim 10, wherein to generate based on the metadata, the profile data, and the second input, context data for the digital request data object comprises:
scanning the metadata and the profile data to generate the context data.

13. The apparatus of claim 10, wherein:
the first input associated with the digital request data object is a natural language input; and analyzing the first input comprises:
applying semantic or syntactic data to one or more data strings to generate a plurality of computing operation recommendations including the at least one computing operation recommendation.

14. The apparatus of claim 10, wherein the digital request data object comprises a document or a file outlining one or more of:
account data associated with a client request, or
data resolving an exception event associated with the digital request data object.

15. The apparatus of claim 10, wherein the second input is associated with a computing operation for analyzing, solving, addressing, or managing a detected exception event associated with the digital request data object.

16. The apparatus of claim 10, wherein
a first computing operation result associated with the selection of the at least one computing operation recommendation or the computing operation associated with the digital request data object is automatically formatted for display on a first graphical user interface based on the context data; and
a second set of computing operation recommendations associated with the second input is automatically formatted for display on the first graphical user interface based on the context data.

17. A method for generating or updating context data associated with a digital request data object in a multi-application network, the method comprising:
receiving, using one or more computing device processors, a first input associated with the digital request data object, the digital request data object comprising a file or data comprised in one or more databases associated with the multi-application network;
determining, using the one or more computing device processors, based on the first input, the digital request data object from the one or more databases associated with the multi-application network;
determining, using the one or more computing device processors, profile data indicating one or more of:
user data associated with the first input, and
first data associated with one or more computing operations executed on the digital request data object;
generating, using the one or more computing device processors, metadata associated with the digital request data object, the metadata indicating one or more of:
historical context data associated with the digital request data object,
a processing stage associated with the digital request data object, or
one or more exception events associated with the digital request data object;
generating or updating, using the one or more computing device processors, based on the metadata and the profile data, context data for the digital request data object;
storing, using the one or more computing device processors, the context data in the one or more databases associated with the multi-application network;
initiating, using the one or more computing device processors, presentation of the context data for the digital request data simultaneously with initiating, using the one or more computing device processors, presentation of an input area for receiving, using the one or more computing device processors, a third input associated with the digital request data object, the third input comprising one or more of:
a selection of at least one second computing operation recommendation generated based on a second input, and
a second computing operation associated with the digital request data object; and
determining a first exception event comprised in the one or more exception events associated with the digital request data object,
wherein the first exception event comprise a disruption in processing the digital request data object during a first stage based on the digital request data object not meeting a requirement or condition during the first stage, and
wherein the requirement or condition is based on at least one of: first additional input, or an absence or partial absence of second additional input, associated with the digital request data object; the profile data for the digital request data object; first analysis data or first computing result data, or an absence or partial absence of second analysis data or second computing result data, from other applications associated with the multi-application network; a time threshold for processing the digital request data object; device profile data associated with a device associated with the digital request data object; credential data associated with a user of the multi-application network or associated with the digital request data object; the context data, or an absence or partial absence of second context data, for the digital request data object; or first client profile data, or an absence or partial absence of second profile data associated with a client associated with the digital request data object.

18. The method of claim 17, wherein the context data comprises an update derived from one or more of the metadata or the profile data.

19. The method of claim 1, wherein the requirement or condition is based on at least one of: the first additional input, or an absence or partial absence of the second additional input, associated with the digital request data object; the profile data for the digital request data object; the first analysis data or the first computing result data, or the absence or partial absence of second analysis data or the second computing result data, from the other applications associated with the multi-application network; the time threshold for processing the digital request data object; the device profile data associated with the device associated with the digital request data object; the credential data associated with the user of the multi-application network or associated with the digital request data object; the context data, or the absence or partial absence of the second context data, for the digital request data object; or the first client profile data, or the absence or partial absence of the second profile data associated with a client associated with the digital request data object, comprises at least two of: the first additional input, or the absence or partial absence of the second additional input, associated with the digital request data object; the profile data for the digital request data object; the first analysis data or the first computing result data, or the absence or partial absence of second analysis data or the second computing result data, from the other applications associated with the multi-application network; the time threshold for processing the digital request data object; the device profile data associated with the device associated with the digital request data object; the credential data associated with the user of the multi-application network or associated with the digital request data object; the context data, or the absence or partial absence of the second context data, for the digital request data object; or the first client profile data, or the absence or partial absence of the second profile data associated with the client associated with the digital request data object.

20. The method of claim 1, wherein the requirement or condition is based on at least one of: the first additional input, or an absence or partial absence of the second additional input, associated with the digital request data object; the profile data for the digital request data object; the first analysis data or the first computing result data, or the absence or partial absence of second analysis data or the second computing result data, from the other applications associated with the multi-application network; the time threshold for processing the digital request data object; the device profile data associated with the device associated with the digital request data object; the credential data associated with the user of the multi-application network or associated with the digital request data object; the context data, or the absence or partial absence of the second context data, for the digital request data object; or the first client profile data, or the absence or partial absence of the second profile data associated with a client associated with the digital request data object, comprises at least three of: the first additional input, or the absence or partial absence of the second additional input, associated with the digital request data object; the profile data for the digital request data object; the first analysis data or the first computing result data, or the absence or partial absence of second analysis data or the second computing result data, from the other applications associated with the multi-application network; the time threshold for processing the digital request data object; the device profile data associated with the device associated with the digital request data object; the credential data associated with the user of the multi-application network or associated with the digital request data object; the context data, or the absence or partial absence of the second context data, for the digital request data object; or the first client profile data, or the absence or partial absence of the second profile data associated with the client associated with the digital request data object.

21. The method of claim 1, wherein the requirement or condition is based on at least one of: the first additional input, or an absence or partial absence of the second additional input, associated with the digital request data object; the profile data for the digital request data object; the first analysis data or the first computing result data, or the absence or partial absence of second analysis data or the second computing result data, from the other applications associated with the multi-application network; the time threshold for processing the digital request data object; the device profile data associated with the device associated with the digital request data object; the credential data associated with the user of the multi-application network or associated with the digital request data object; the context data, or the absence or partial absence of the second context data, for the digital request data object; or the first client profile data, or the absence or partial absence of the second profile data associated with a client associated with the digital request data object, comprises at least four of: the first additional input, or the absence or partial absence of the second additional input, associated with the digital request data object; the profile data for the digital request data object; the first analysis data or the first computing result data, or the absence or partial absence of second analysis data or the second computing result data, from the other applications associated with the multi-application network; the time threshold for processing the digital request data object; the device profile data associated with the device associated with the digital request data object; the credential data associated with the user of the multi-application network or associated with the digital request data object; the context data, or the absence or partial absence of the second context data, for the digital request data object; or the first client profile data, or the absence or partial absence of the second profile data associated with the client associated with the digital request data object.

22. The method of claim 1, wherein the requirement or condition is based on at least one of: the first additional input, or an absence or partial absence of the second additional input, associated with the digital request data object; the profile data for the digital request data object; the first analysis data or the first computing result data, or the absence or partial absence of second analysis data or the second computing result data, from the other applications associated with the multi-application network; the time threshold for processing the digital request data object; the device profile data associated with the device associated with the digital request data object; the credential data associated with the user of the multi-application network or associated with the digital request data object; the context data, or the absence or partial absence of the second context data, for the digital request data object; or the first client profile data, or the absence or partial absence of the second profile data associated with a client associated with the digital request data object, comprises at least five of: the first additional input, or the absence or partial absence of the second additional input, associated with the digital request data object; the profile data for the digital request data object; the first analysis data or the first computing result data, or the absence or partial absence of second analysis data or the second computing result data, from the other applications associated with the multi-application network;

the time threshold for processing the digital request data object; the device profile data associated with the device associated with the digital request data object; the credential data associated with the user of the multi-application network or associated with the digital request data object; the context data, or the absence or partial absence of the second context data, for the digital request data object; or the first client profile data, or the absence or partial absence of the second profile data associated with the client associated with the digital request data object.

23. The method of claim 1, wherein the requirement or condition is based on at least one of: the first additional input, or an absence or partial absence of the second additional input, associated with the digital request data object; the profile data for the digital request data object; the first analysis data or the first computing result data, or the absence or partial absence of second analysis data or the second computing result data, from the other applications associated with the multi-application network; the time threshold for processing the digital request data object; the device profile data associated with the device associated with the digital request data object; the credential data associated with the user of the multi-application network or associated with the digital request data object; the context data, or the absence or partial absence of the second context data, for the digital request data object; or the first client profile data, or the absence or partial absence of the second profile data associated with a client associated with the digital request data object, comprises at least six of: the first additional input, or the absence or partial absence of the second additional input, associated with the digital request data object; the profile data for the digital request data object; the first analysis data or the first computing result data, or the absence or partial absence of second analysis data or the second computing result data, from the other applications associated with the multi-application network; the time threshold for processing the digital request data object; the device profile data associated with the device associated with the digital request data object; the credential data associated with the user of the multi-application network or associated with the digital request data object; the context data, or the absence or partial absence of the second context data, for the digital request data object; or the first client profile data, or the absence or partial absence of the second profile data associated with the client associated with the digital request data object.

\* \* \* \* \*